United States Patent [19]

Nitschke

[11] Patent Number: 4,514,208
[45] Date of Patent: Apr. 30, 1985

[54] APPARATUS FOR BENDING GLASS SHEETS

[75] Inventor: Dean M. Nitschke, Maumee, Ohio
[73] Assignee: Glasstech, Inc., Perrysburg, Ohio
[21] Appl. No.: 543,916
[22] Filed: Oct. 20, 1983
[51] Int. Cl.³ ............................................. C03B 23/035
[52] U.S. Cl. ........................................ 65/273; 65/106; 65/287; 65/291
[58] Field of Search ................ 65/106, 273, 287, 290, 65/291

[56] References Cited

U.S. PATENT DOCUMENTS 3,116,993  1/1964  Richardson .................. 65/290 X
4,229,200 10/1980  Seymour ....................... 65/273 X Primary Examiner—Arthur Kellogg
Attorney, Agent, or Firm—Brooks & Kushman

[57] ABSTRACT

An apparatus disclosed for use in bending heated sheets of glass transported generally horizontally on a conveyor within a furnace heating chamber includes a holder and a counterbalanced bending member, both of which are located above the conveyor in a spaced relationship such that a heated sheet of glass can be transported under the holder. The holder includes a curved, downwardly facing surface with spaced openings in which vacuum is drawn to receive the glass sheet from the conveyor. Gas, such as air, is blown upwardly from below the conveyor against the heated sheet of glass such that the sheet is moved upwardly and into engagement with the curved surface of the holder. The bending member then moves downwardly below the holder surface and thereafter upwardly against the heated sheet of glass to provide bending thereof to the curved shape of the holder surface. The bending member then moves back to its home position above the holder surface. A carrier mold ring moves under the supported glass and the vacuum is then terminated so the glass drops onto the ring and bends under the bias of gravity in a manner that allows the glass to be further bent. Subsequently, the mold ring is moved from the furnace to a quench unit that tempers the glass.

11 Claims, 10 Drawing Figures

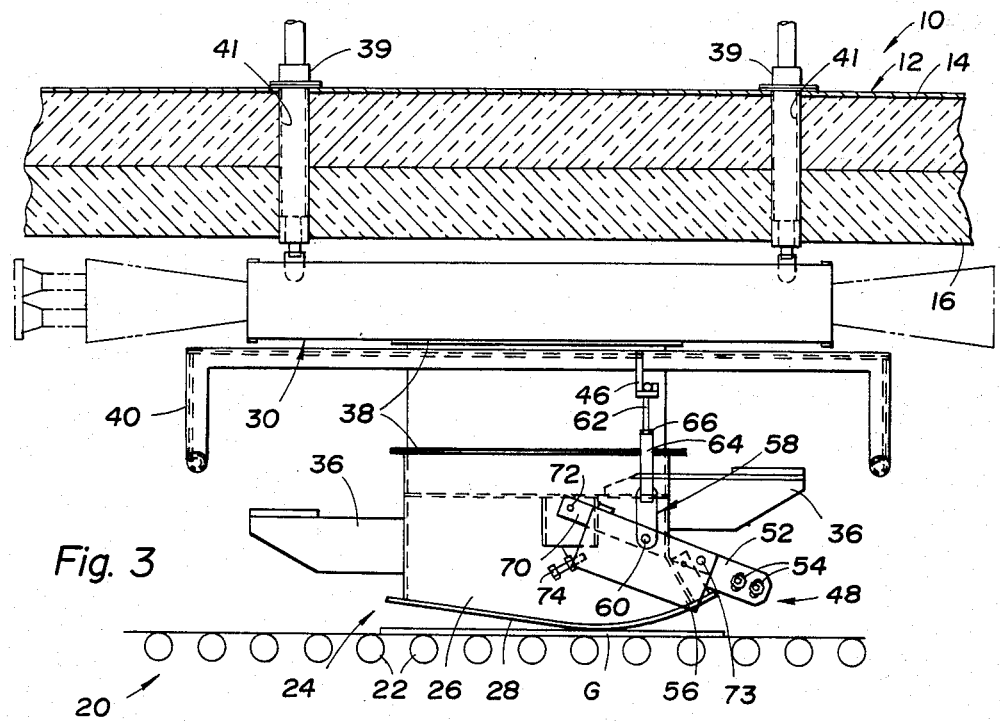
Fig. 3
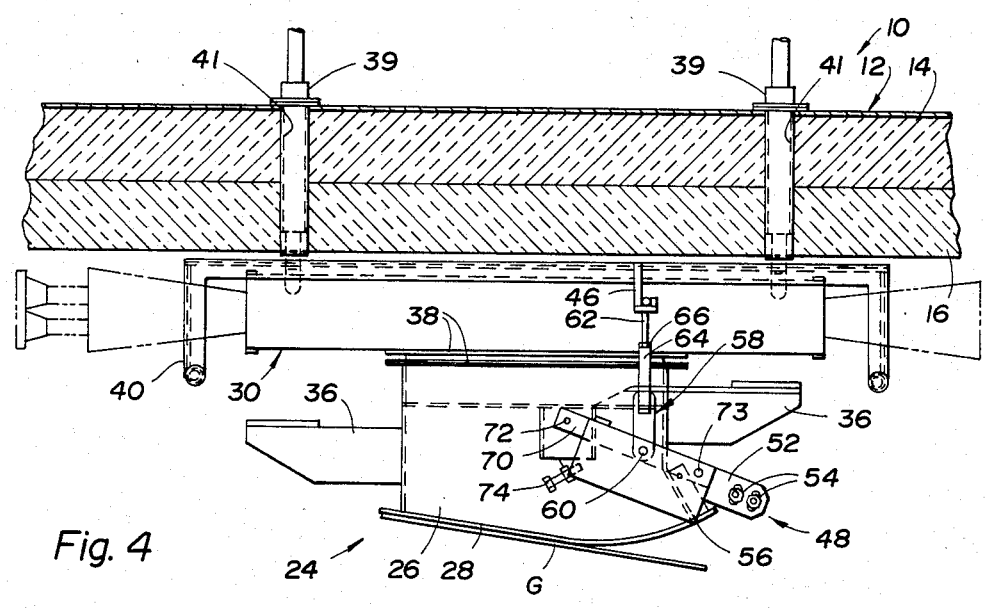
Fig. 4
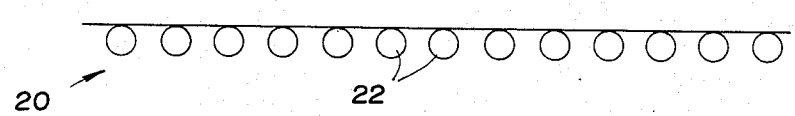

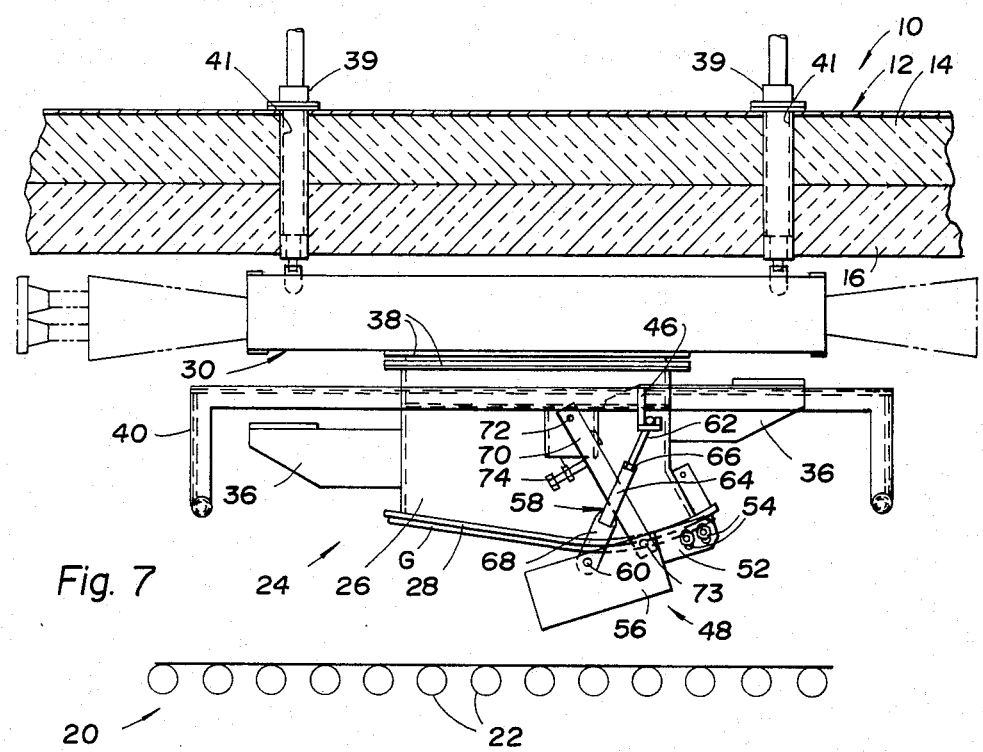
Fig. 7
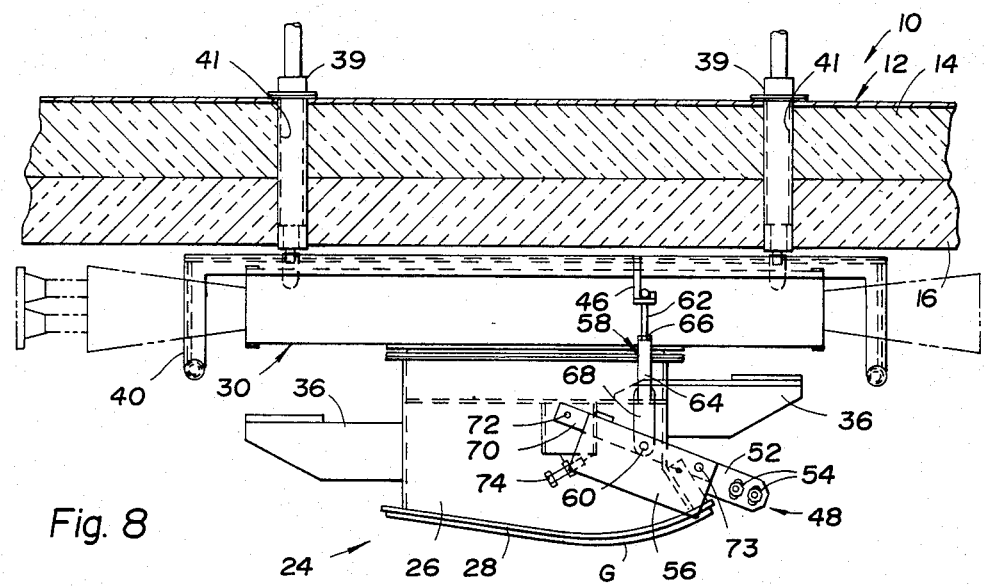
Fig. 8
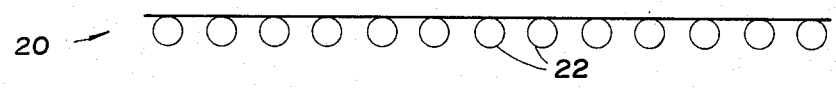

APPARATUS FOR BENDING GLASS SHEETS

TECHNICAL FIELD

The invention relates to apparatus for bending and tempering sheet glass.

BACKGROUND ART

Bent and tempered glass is used extensively for vehicle side and rear windows to provide good resistance to breakage as well as an aesthetically appealing shape that complements the design of the vehicle. In order to perform the bending and tempering, sheet glass must be heated to its deformation point of about 1200° to 1300° F. and then bent to the required shape before being rapidly cooled by an air spray in order to temper the glass. Tempering greatly increases the mechanical strength of the glass and its resistance to breakage as well as causing the glass to break into small relatively dull pieces when broken instead of into large sharp slivers as is the case with untempered glass.

One manner in which glass is bent and tempered is with press benders having shaped surfaces between which heated glass is clamped to shape it prior to being air cooled by a quench unit to provide tempering. U.S. Pat. Nos. 3,454,389; 3,476,542; 3,488,178; 3,600,150 and 3,951,634 disclose press bending and tempering apparatus for sheet glass.

Sheet glass is also bent and tempered by heating of planar glass sheets, while supported on bending molds including movable sections. Prior to softening of the glass during heating, the sections of the mold are oriented to accommodate for the glass sheet planarity. Upon softening of the glass sheet as it is heated, the mold sections move relative to each other under the force of gravity acting on the sheet and the mold sections in order to provide bending of the sheet prior to rapid cooling thereof which provides its tempering. Thin glass, i.e. on the order of $\frac{1}{8}''$, cannot be bent by this apparatus since it does not have sufficient weight to actuate the pivoting of the mold sections until the glass becomes so soft that it overbends. U.S. Pat. Nos. 3,269,822; 3,278,287; 3,307,930 and 3,365,285 disclose this type of bending and tempering apparatus.

Heating of glass sheets prior to bending and tempering thereof has also been performed on fluid support beds as the glass is conveyed through a furnace. Normally the support bed is inclined slightly with respect to the horizontal so that gravity engages an edge of the glass with a movable frame that provides the impetus for glass movement along the bed. There is no contact between the bed and the oppositely facing surfaces of the glass during the conveyance as the glass is heated. This lack of contact prevents marring and scratching of the soft surfaces of the glass as the glass reaches its deformation temperature. However, there normally is mechanical contact with the glass during the bending after the heating in preparation for a cooling quench that tempers the glass in its bent condition. U.S. Pat. Nos. 3,497,340; 3,607,187 and 3,607,200 disclose glass bending and tempering apparatus of this type with a fluid support bed.

Vacuum forming of heated glass sheets is disclosed by U.S. Pat. No. 3,778,244 wherein the sheet glass is first heated during conveyance along a roller hearth conveyor. After heating, a lifter with a curved downwardly facing surface has a vaccum applied thereto about the surface to shape the glass. After shaping against the curved surface of the lifter, the vacuum is terminated to drop the glass onto a mold for conveyance to a waiting operator who removes the glass from the mold. Further vacuum forming of the glass to a curved surface of the mold is also disclosed.

Other bending and tempering apparatus for sheet glass is disclosed by U.S. Pat. Nos. 2,223,124; 2,348,887; 2,646,647 and 2,085,520.

U.S. Pat. No. 4,305,746 to Hagedorn et al discloses an apparatus for bending glass sheets including a plurality of shaping pads mounted within the outline of a shaping ring in combination with configurated conveyor rolls for preliminarily bending a heat-softened glass sheet prior to final bending.

U.S. Pat. No. 4,312,661 to Hagedorn et al discloses an apparatus for bending glass sheets including an articulated press member having pivotal end sections for imparting complex shapes to glass sheets. The end sections are pivoted in unison by a fluid actuated cylinder operatively connected to a rack and pinion assembly which, in turn, is connected to both end sections for effecting concurrent and equal pivotal movement thereof.

DISCLOSURE OF THE INVENTION

An object of the present invention is to provide an improved apparatus for bending heated sheets of glass transported generally horizontally on a conveyor. The glass bending apparatus is particularly adaptable for use in bending heated glass sheets prior to quenching of the glass to provide tempering thereof but also can be utilized to bend glass which is then annealed.

Another object of the present invention is to provide an improved apparatus capable of bending thin glass sheets i.e. on the order of $\frac{1}{8}''$ thick at relatively high production rates while providing accurate control of the shape to which the glass is bent.

Yet still another object of the present invention is to provide an apparatus for bending heated sheets of glass transported generally horizontally on the conveyor at a bending station which includes a holder assembly having a holder with a curved surface for receiving glass sheets from the conveyor and wherein the bending member is mounted on the holder assembly for movement relative to the holder and is adapted to engage the heated glass sheets received by the holder to provide bending thereof to the curved shape of the holder surface.

In carrying out the above objects and other objects of the present invention, the invention comprises a glass sheet bending station including a conveyor for conveying glass sheets generally horizontally and a holder assembly including a holder having a curved surface for receiving heated glass sheets from the conveyor. A bending member is mounted on the holder assembly for movement relative to the holder and is adapted to engage a heated glass sheet received by the holder to provide bending thereof to the curved shape of the holder surface.

Preferably, the bending member is mounted for pivotal movement under the influence of gravity upwardly towards the holder surface. The bending member moves between a storage position located above the curved surface of the holder and a work position in which the bending member engages the heated glass sheet.

Also, preferably, the bending member is attached to a frame assembly which is mounted for movement independent of and relative to the holder assembly. At least one counterbalance member is attached to the frame assembly and is pivotally connected to the holder assembly to pivot about a first axis. The bending member is mounted on the counterbalance member for movement therewith. The counterbalance member pivots about the first axis to move the bending member from a position above the curved surface to a position below the curved surface upon relative movement between the frame assembly and the holder assembly.

The bending member facilitates deep bending of the glass sheets in that a higher bending force can be applied by the bending member as the glass sheet is held by the holder at its downwardly curved face thereof. Because a higher bending force can be used, the bending temperature may be reduced, thereby resulting in less distortion during the bending process.

The bending member may be aligned relative to the holder assembly outside of the furnace environment for maintenance purposes without compromising the accuracy of their relative positions.

The use of such a bending member results in a reduction in airflow at the bending station to thereby minimize the effects of relatively cool air infiltrating the bending station. Such infiltration prematurely cools the glass sheets.

By supporting the bending member above the glass line, the conveyor or its rolls need not be modified to accommodate the bending member.

The vacuum holder is positioned at the glass sheet bending station adjacent the conveyor rolls. The vacuum holder has a downwardly facing curved surface with restricted openings spaced thereover. The vacuum holder has a downwardly facing openings to receive the heated sheet of glass from the conveyor and support the glass above the conveyor. Upwardly blown gas cooperates with the vacuum drawn through the holder in order to provide lifting of the glass sheet off the conveyor into engagement with the curved surface of the holder. The vacuum drawn at the holder surface is controlled so that it can be decreased after pickup to prevent deformation of the lifted sheet of glass. Gas under slight pressure can also be supplied to the holder to blow the lifted sheet of glass downwardly away from the holder onto a mold ring.

Upon the initial pickup of the glass by the holder, a first portion of the sheet of glass is partially formed to the curved shape of the holder. A second portion of the sheet of glass is prevented from drooping downwardly by the upwardly blown gas. The bending member bends the second portion of the sheet of glass to the curved shape of the molded surface. Subsequent bending of the sheet of glass on the mold ring allows forming thereof to the required curvature which may be the same as or greater than the curvature of the curved holder.

The objects, features and advantages of the present invention are readily apparent from the following detailed description of the preferred mode when taken in connection with the accompanying drawings.

BRIEF DESCRIPTION OF THE DRAWINGS

FIG. 3 is a side elevational view of the apparatus in its glass pickup position;

FIG. 4 is a view similar to FIG. 3 of the apparatus with the bending member in its home position;

FIG. 7 is a view similar to FIG. 3 wherein the bending member is in the bending position shown in FIG. 2;

FIG. 8 is a view similar to FIG. 3 wherein the bending member is shown in its home position;

BEST MODE FOR CARRYING OUT THE INVENTION

Figure 1:
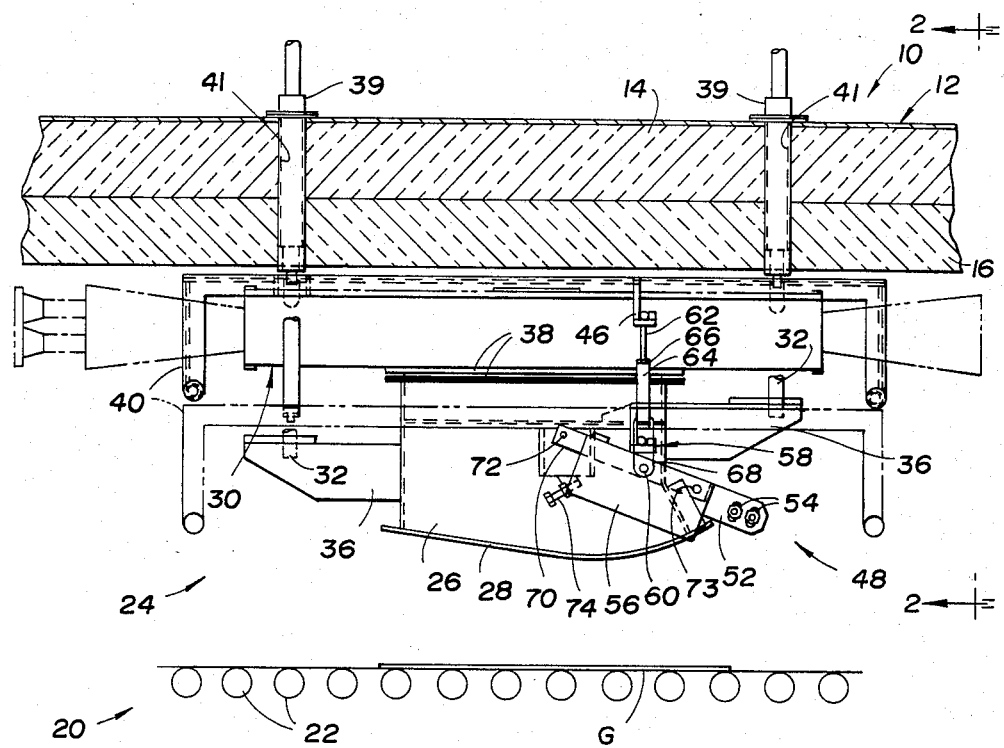
FIG. 1 is an elevational view of glass bending apparatus located at a bending station constructed in accordance with the present invention wherein an assembly of the apparatus is shown in two positions, one by solid lines and the other by phantom lines.

Referring to FIG. 1 of the drawings a glass bending station indicated generally at 10 incorporates apparatus constructed in accordance with the present invention. The bending station 10 includes a furnace in which sheet glass is heated. The furnace includes a housing having an upper housing portion generally indicated at 12 comprising housing members 14 and 16. The upper housing portion 12 includes a pair of side members 18 which extend downwardly from the members 14 and 16 to cooperate with an upwardly opening U-shaped lower housing portion (not shown) to define a heating chamber. While not shown, the housing member 16 has T-shaped retainers and heater elements secured thereby for heating the sheet glass.

The furnace also includes a roller hearth conveyor generally indicated at 20. The rollers or rolls 22 of the conveyor 20 transport sheets of glass G in a horizontal orientation for heating within the heating chamber of the furnace.

The station 10 also includes a holder assembly, generally indicated at 24, including a holder 26 which has a lower curved surface 28 of a downwardly convex shape. As shown in the U.S. patent to McMaster et al U.S. Pat. No. 4,204,854, the disclosure of which is hereby incorporated by reference, openings in the surface 28 communicate with the plenum of the assembly 24 in which a vacuum may be drawn by a vacuum generator, generally indicated at 30. A vacuum generator generally of the type to which this invention relates is shown in the U.S. patent to McMaster U.S. Pat. No. 4,222,763. Vertical rods 39 support the vacuum generator 30 at a fixed location within the heating chamber relative to the holder assembly 24. The vertical rods 39 are received within holes 41 which extend through the members 14 and 16. The holes 41 allow vertical movement of the vacuum generator 30 in a downward direction for maintenance purposes.

An actuator, which mounts the holder assembly 24 for vertical movement upwardly and downwardly, includes vertical rods 32 which, for the sake of simplicity, are omitted from FIGS. 3 through 10. The lower ends of the vertical rods are threaded to locking nuts 34 for mounting the vertical rods 32 on brackets 36 mounted on opposite sides of the holder 26. Holes formed in the upper portion 12 receive intermediate portions of the rods 32 to allow vertical movement thereof as shown in U.S. patent to McMaster et al U.S. Pat. No. 4,282,026, the entire disclosure of which is incorporated hereby by reference.

The vacuum generator 30 is connected to and in communication with the holder 26 by a pair of relatively movable, telescoping collar members 38. One of the collar members 38 is fixedly attached to a bottom portion of the vacuum generator 30 which, in turn, is fixed relative to the holder assembly 24. The other of the collar members 38 is fixedly secured at a top portion of the holder 26 to move therewith to insure that the holder 26 is in communication with the vacuum generator 30 as the holder 26 moves relative to the vacuum generator 30 in an upwardly or downwardly vertical direction.

Downward movement of the holder 26 to the position shown in FIG. 3 positions the holder surface 28 in proximity to a central portion of the heated sheet of glass G which is transported under the holder 26. Lift jets (not shown) mounted within the furnace heating chamber beneath the conveyor 20 is supplied positive gauge pressure gas such as heated air in the chamber by a blower, which blows the glass into engagement with the lower surface 28 of the holder 26. As seen in FIG. 4, the holder 26 is subsequently moved upwardly and the upwardly blown gas prevents the ends of the glass sheet G from dropping or drooping downwardly relative to the central portion of the glass sheet G. The upwardly blown gas urges the glass sheet G upwardly toward the curved shape of the holder surface 28. The vacuum drawn with the holder 26 and within its surface openings also assists the upwardly blown gas in lifting the glass sheet and also assists in bending the glass sheet G.

Apparatus constructed in accordance with this invention also includes a U-shaped frame assembly 40 which is mounted for vertical movement upwardly and downwardly independently of and relative to the holder assembly 24. An actuator for the frame assembly 40 is generally of the type as that used for actuating the holder assembly 24 as previously mentioned.

The actuator of the frame assembly 40 includes vertical rods 42 which support the frame assembly 40 for movement therewith below the housing members 14 and 16. Holes 44 which extend through the members 14 and 16 receive intermediate portions of the rods 42 to allow vertical movement thereof.

Figure 2:
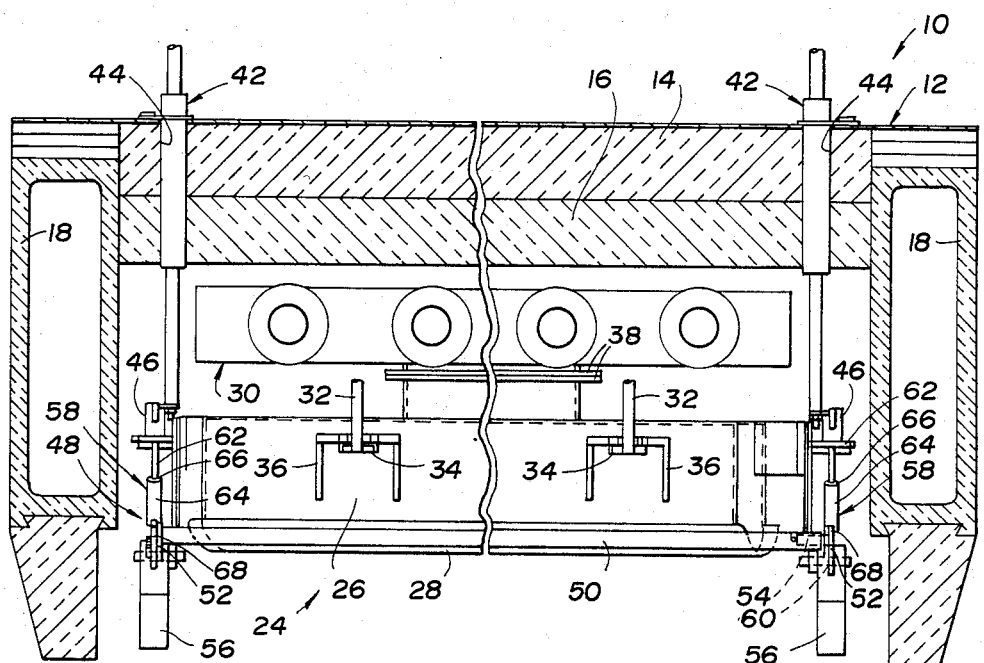
FIG. 2 is an end view of the apparatus of FIG. 1 with the bending member of the apparatus shown in a bending position.

The frame assembly 40 includes a pair of J-shaped bracket members 46 mounted on opposite sides of the frame assembly 40 as shown in FIG. 2. The bracket members 46 support a press bar assembly, generally indicated at 48. The assembly 48 includes a bending member 50 as best shown in FIG. 2 which is mounted between a pair of spaced mounting plates 52 by bolts 54. The bending member preferably comprises a stainless steel bar covered with a braided ceramic fiber sleeving to prevent marring of the glass sheet G.

Each of the plates 52 are integrally connected to a counterweight or counterbalance 56 which urges the entire press bar assembly 48 downwardly under the force of gravity. In turn, each of the counterweights 56 is pivotally connected to a first link assembly 58 at a pivot 60. Each of the link assemblies 58 includes a T-shaped member 62, the top portion of which is held by its J-shaped bracket 46 and the lower portion of which is threadedly received within one end of an intermediate link 64 and secured thereto by a locking nut 66. Relative rotation between the link member 62 and the intermediate link 64 varies the effective length of the link member 62. The opposite end of the intermediate link 64 is received and retained within a lower link 66 at one end thereof and which is pivotally connected at its opposite end to the counterweight 56 at the pivot 60.

Each of the counterweights 56 is also pivotally connected to a second link assembly 70 at a pivot 73 which is disposed between the pivot 60 and the bending member 50. Each of the link assemblies 70 is also pivotally connected to the holder 26 at a pivot 72. Stop member 74 mounted on opposite sides of the holder 26 limit downward movement of the link assembly 70 under the weight of the counterbalances 56 upon relative movement between the frame assembly 40 and the holder assembly 24.

Referring now to the drawings, operation of the apparatus constructed in accordance with the present invention will be described.

Figure 5:
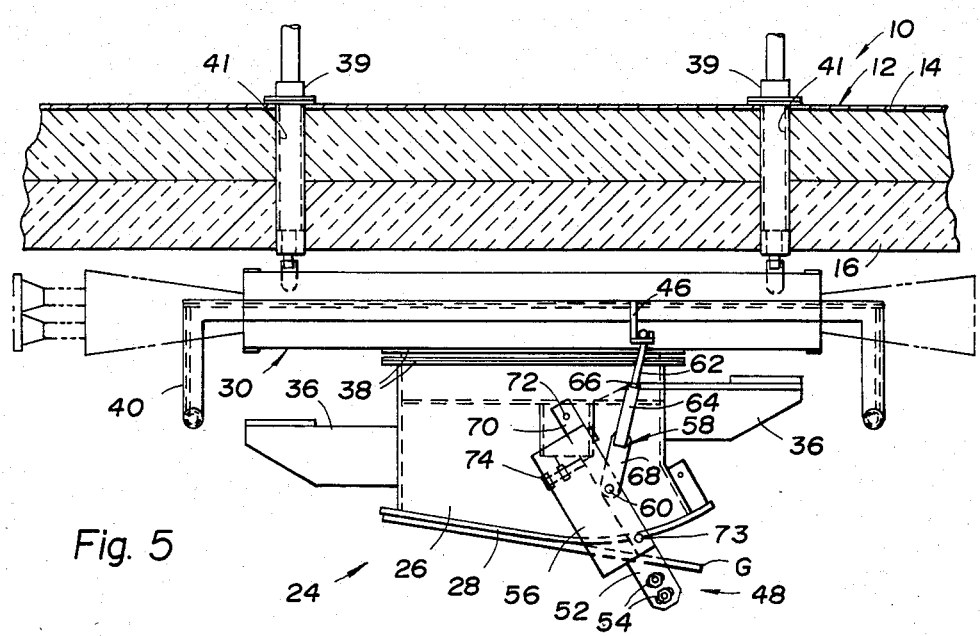
FIG. 5 is a view similar to FIG. 3 wherein the bending member is positioned below the bottom surface of the glass sheet.

Initially the holder assembly 24 is in its uppermost position as shown in FIG. 1 and wherein the press bar assembly 48 is in its up or home position. As shown in FIG. 3, after a piece of glass G to be removed from the rolls 22 of the conveyor 20, moves under the holder 26, both the holder assembly 24 and the press bar assembly 48 move in unison to a pick-up position immediately adjacent the glass sheet G. After the application of an air pressure force, the holder assembly 24 lifts the sheet of glass G while the press bar assembly 48 moves in unison with the holder assembly 24 as shown in FIG. 4. As shown in FIG. 5, the frame assembly 40 then moves downwardly relative to the holder assembly 24 to thereby allow each counterbalance 56 to rotate downwardly about the pivots 72 until the link assemblies 70 engage the stops 74, at which point the bending member 50 is located below the glass sheet G.

Figure 6:
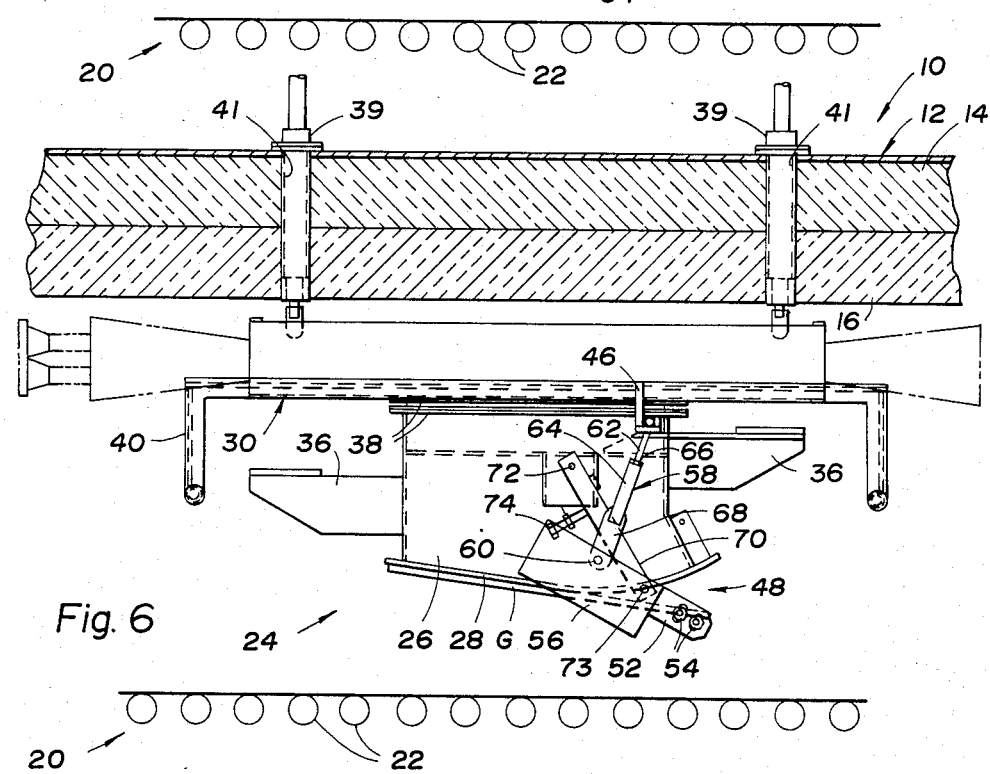
FIG. 6 is a view similar to FIG. 3 wherein the bending member is in engagement with the lower surface of the glass sheet.

As shown in FIG. 6, further movement of the frame assembly 40 downwardly relative to the holder assembly 24, causes the counterweights 56 to rotate about the pivots 73 to cause the bending member 50 to engage the glass sheet G at its unbent portion. The lifting air can now be terminated.

Further movement of the frame assembly 40 downwardly relative to the holder assembly 24 as seen in FIG. 7, causes further pivotal movement of the counterbalances 56 about the pivots 73 to urge the unbent portion of the glass sheet G engaged by the bending member 50 against the lower surface 28 of the holder 26.

In order to move the bending member 50 from engagement with the glass sheet G back to its home position the above-described steps are reversed by moving the frame assembly 40 upwardly relative to the holder assembly 24 until the frame assembly 40 reaches its home position as shown in FIG. 8.

Figure 9:
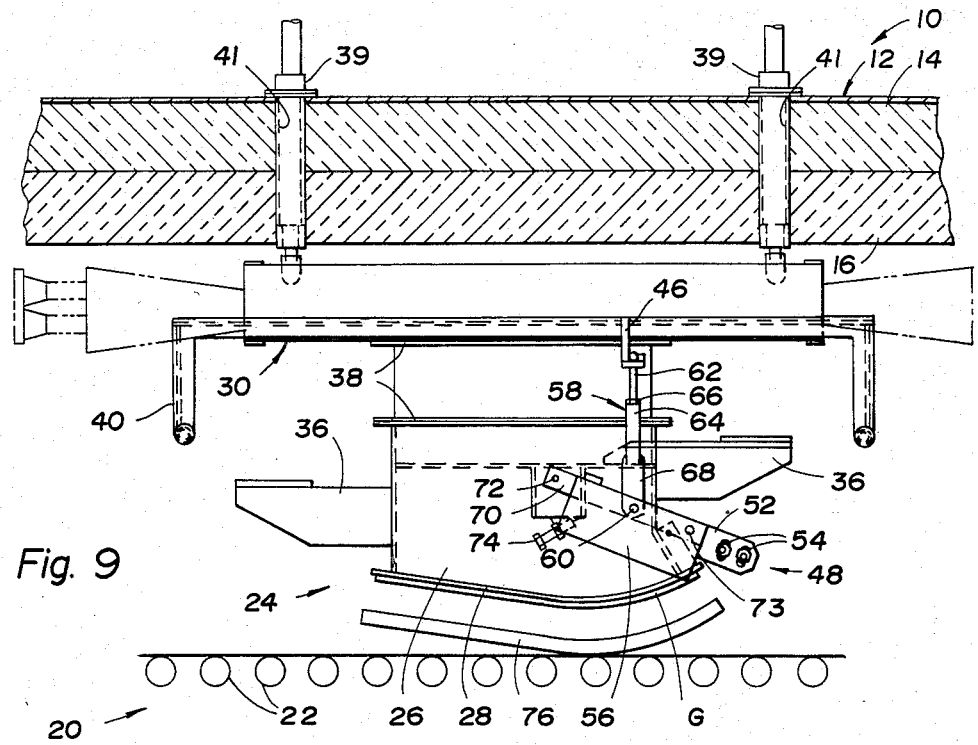
FIG. 9 is a view similar to FIG. 3 wherein a mold ring is shown positioned within the bending station to receive the bent glass sheet.
Figure 10:
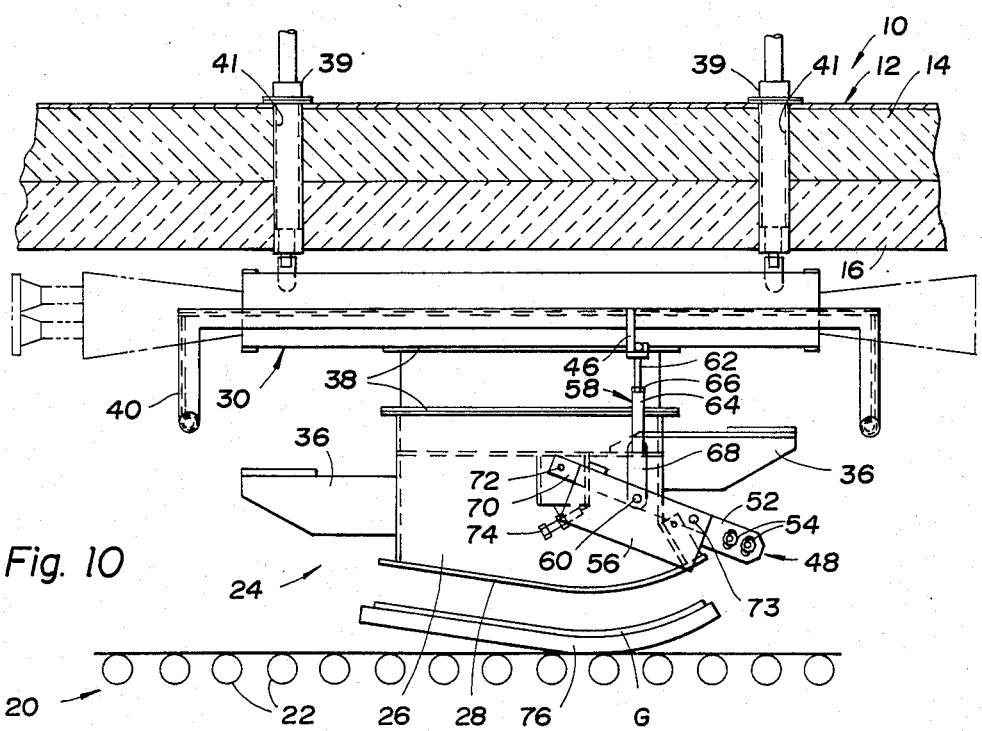
FIG. 10 is a view similar to FIG. 3 wherein the heated glass sheet is shown on the mold ring for additional bending.

A curved mold 76 is then moved under the holder 26 as shown in FIG. 9 and the holder 26 is moved downwardly toward the mold 76 to decrease the distance between the lower surface 28 of the holder 26 and the mold 76. Thereafter, the partially bent sheet of glass G is dropped downwardly by termination of the vacuum drawn at the surface 28. Gravity then causes the sheet of glass to sag to the shape of the mold ring 76. The ends of the glass sheet G are thus effectively bent upwardly by the downward sagging of the central portion of the glass sheet G as shown in FIG. 10.

The bending member 50 facilitates deep bending of the glass sheets in that a higher bending force can be applied by the bending member 50 as the glass sheet is held by the holder 26 at its downwardly curved face thereof. Because a higher bending force can be used, the bending temperature may be reduced, thereby resulting in less distortion during the bending process.

The bending member 50 may be aligned relative to the holder assembly 24 outside of the furnace environment for maintenance purposes without compromising the accuracy of their relative positions.

The use of such a bending member 50 results in a reduction in airflow at the bending station 10 to thereby minimize the effects of relatively cool air infiltrating the bending station 10. Such infiltration prematurely cools the glass sheets.

By supporting the bending members 50 above the glass line, the conveyor 20 or its rolls 22, need not be modified to accommodate the bending member 50.

While the best mode for practicing the invention has herein been described in detail, those skilled in this art will recognize various alternative designs and embodiments for practicing the present invention as defined by the following claims.

What is claimed is:

1. In a glass sheet bending station including a conveyor for conveying glass sheets generally horizontally, and a holder assembly including a holder having a curved surface for receiving heated glass sheets from the conveyor, the improvement comprising:
    a bending member mounted on the holder assembly for movement from a storage position located above the conveyor to a position below the curved surface and thereafter upwardly for engaging a heated glass sheet received by the holder from the conveyor to provide bending thereof to the curved shape of the holder surface.

2. in a glass sheet bending station including a conveyor for conveying glass sheets generally horizontally, and a holder assembly including a holder having a curved surface for receiving heated glass sheets from the conveyor, the improvement comprising:
    a bending member mounted for pivotal movement under the influence of gravity from a storage position located above the conveyor to a position below the curved surface and thereafter upwardly towards the holder surface, said bending member being adapted to engage a heated glass sheet received by the holder from the conveyor to provide bending thereof to the curved shape of the holder surface.

3. In a glass sheet bending station including a conveyor for holding glass sheets generally horizontally, and a holder assembly including a holder having a curved surface for receiving heated glass sheets from the conveyor, the improvement comprising:
    a bending member mounted for movement between a storage position located above the curved surface of the holder to a position below the curved surface and thereafter upwardly to a work position in which the bending member engages a heated glass sheet received by the holder to provide bending thereof to the curved shape of the holder surface.

4. In a glass sheet bending station including a conveyor for conveying glass sheets generally horizontally, and a holder assembly including a holder having a curved lower surface for receiving heated glass sheets having top and bottom surfaces from the conveyor, the improvement comprising:
    a bending member pivotally connected to the holder assembly for movement from a storage position located above the conveyor to a position below the lower surface of the holder and thereafter upwardly to engage the bottom surface of a heated glass sheet received by the holder from the conveyor to provide bending thereof to the curved shape of the holder surface.

5. In a glass sheet bending station including a conveyor for conveying glass sheets generally horizontally, and a holder assembly including a holder having a curved surface for receiving heated glass sheet from the conveyor, the improvement comprising:
    a frame assembly mounted for movement independent of and relative to said holder assembly; and
    a bending member attached to the frame assembly and connected to the holder assembly for movement from a storage position located above the conveyor to a position below the curved surface and thereafter upwardly, said bending member being adapted to engage a heated glass sheet received by the holder from the conveyor to provide bending thereof to the curved shape of the holder surface.

6. In a glass sheet bending station including a conveyor for conveying glass sheets generally horizontally, and a holder assembly including a holder having a curved surface for receiving heated glass sheets from the conveyor, the improvement comprising:
    a frame assembly mounted for movement independent of and relative to said holder assembly;
    at least one counterbalance member attached to said frame assembly and pivotally connected to said holder assembly to pivot about a first axis;
    a bending member mounted on said counterbalance member for movement therewith, said bending member being adapted to engage a heated glass sheet received by the holder to provide bending thereof to the curved shape of the holder surface; said counterbalance member pivoting about the first axis to move said bending member from a position above the curved surface to a position below the curved surface and thereafter moving said bending member upwardly for engaging the heated glass sheet upon relative movement between the frame assembly and the holder assembly.

7. The invention as claimed in claim 6 including a first link assembly attached to said frame assembly and pivotally connected to said counterbalance member to pivot about a second axis.

8. The invention as claimed in claim 7 wherein the longitudinal length of said first link assembly is adjustable.

9. The invention as claimed in claim 7 including a second link assembly connected to the holder assembly to pivot about the first axis and pivotally connected to said counterbalance member to pivot about a third axis parallel to said first axis.

10. The invention as claimed in claim 9 including stop means mounted on said holder assembly for limiting pivotal movement of said second link assembly about the first axis, said counterbalance member holding the bending member at the position below the curved surface.

11. The invention as claimed in claim 10 wherein said third axis is disposed between the second axis and the bending member, said stop means limiting pivotal movement of the second link assembly during further relative movement between the frame assembly and the holder assembly so that said counterbalance member pivots the bending member about the third axis against the heated glass sheet.

* * * * *